(12) United States Patent
Lipari (10) Patent No.: US 6,851,563 B1
(45) Date of Patent: Feb. 8, 2005

(54) RACK APPARATUS FOR STORING AND HANDLING WATER BOTTLES

(76) Inventor: Frank Lipari, 141 Eileen Dr., Cedar Grove, NJ (US) 07009

( * ) Notice: Subject to any disclaimer, the term of this patent is extended or adjusted under 35 U.S.C. 154(b) by 42 days.

(21) Appl. No.: 10/379,640

(22) Filed: Mar. 5, 2003

Related U.S. Application Data (60) Provisional application No. 60/362,943, filed on Mar. 8, 2002.

(51) Int. Cl.[7] .............................. A47F 5/00; A47F 7/00
(52) U.S. Cl. ..................... 211/74; 211/59.4; 280/79.3
(58) Field of Search .................... 280/79.3; 211/59.4, 211/74; 206/446, 564, 203; 108/55.3

(56) References Cited

U.S. PATENT DOCUMENTS

| | | |
|---|---|---|
| 3,995,749 A | 12/1976 | Haskins |
| 4,162,738 A | 7/1979 | Wright |
| 4,344,530 A | 8/1982 | deLarosiere |
| 4,516,677 A | 5/1985 | Rowland et al. |
| 4,653,651 A | 3/1987 | Flum |
| 4,700,837 A | 10/1987 | Hammett |
| 4,801,024 A | 1/1989 | Flum et al. |
| 4,865,202 A | 9/1989 | Day |
| 5,038,961 A | 8/1991 | Watanabe et al. |
| D327,970 S | 7/1992 | Watanabe et al. |
| 5,144,897 A | 9/1992 | Avery |
| 5,330,050 A | 7/1994 | Stansbury, Jr. et al. |
| 5,360,112 A | 11/1994 | Beauchamp |
| 5,377,862 A | 1/1995 | Oakes et al. |
| 5,379,905 A * | 1/1995 | Bustos et al. ............... 211/59.2 |
| 5,405,042 A * | 4/1995 | Apps et al. .................. 220/510 |
| 5,673,792 A * | 10/1997 | Aikio .......................... 206/509 |
| 6,073,793 A | 6/2000 | Apps et al. |
| 2002/0043509 A1 * | 4/2002 | Lajeunesse et al. ........ 211/59.2 |
| 2004/0026346 A1 * | 2/2004 | Kelly et al. .................... 211/74 |

* cited by examiner

Primary Examiner—Robert W. Gibson, Jr.
(74) Attorney, Agent, or Firm—Carella Byrne et al; William Squire (57) ABSTRACT

Five gallon water bottles for refilling water coolers are stored on a hand truck and on the floor of a user's facility employing three racks. A lower rack stores eight bottles in staggered arrays to be carried by a conventional hand truck. An intermediate rack is formed by bonding a duplicate of the lower rack to a duplicate of the upper top rack. The or rack has bottle supports and dividers for supporting the bottles in the staggered array. The intermediate rack has a lower rack portion the same as the top rack with cylindrical depending members for receiving the necks and spouts of the bottles on the lower rack. The top rack has the depending members for receiving the necks and spouts of the bottles on the intermediate rack. The intermediate rack upper potion is the same as the lower rack for receiving an upper array of bottles. The racks have depending ribs which engage each other in the intermediate rack and wherein the lower rack ribs engage the hand truck support platform rails to preclude shifting of the racks during transport. A total of sixteen bottles are carried. In another embodiment, all three racks are identical and similar to the intermediate rack of the first embodiment, except formed molded as one piece.

24 Claims, 9 Drawing Sheets

RACK APPARATUS FOR STORING AND HANDLING WATER BOTTLES

This application claims the benefit of provisional application Ser. No. 60/362,943 filed Mar. 8, 2002, entitled "Rack Apparatus for Storing and Handling Water Bottles" incorporated by reference herein in its entirety.

This invention relays to bottled water storing and handling racking and transport systems, and more particulary, to a rack apparatus for loading five gallon water bottles on a hand truck to facilitate transporting the battles and a rack apparatus for storing the filled bottles.

Bottled water for use in water coolers are in wide use in industry. These coolers typically are filled by five gallon water bottles delivered to the user and returned to the water supplier when empty. These bottles are transported on hand trucks and are relatively cumbersome to transport and store. Generally the bottles are stored horizontally on a floor in stacked relation or stored horizontally on the hand truck for transport full and empty. The hand truck may be of the type referred to as a Magliner™ 3 position aluminum truck available from Global Equipment Co. as model GK585385 as shown in its Buyer's Guide GK2 V1, page 114. The bottle necks and spouts are oriented horizontal with the bottles laying on their side walls. The bottles typically are stored on the hand truck in individual corresponding crates, each crate holding and storing one bottle. The crates are stacked on the hand truck topically in two overlying arrays of four bottles in a single column.

The crates are molded plastic square boxes with open tops. The bottles and crates are also stored on a floor in the same manner as on the hand truck A further hand truck design is known as the Magliner™ folding tray hand truck. This truck has fold up trays that are arranged so that each tray holds a bottle horizontally during transport. The trays are available with slide bottle stop kit to prevent the bottles from sliding off of the tray during transport. The hand truck can carry up to four bottles. This truck carries less bottles than the 3 position truck which can carry two layers of four bottle arrays in each layer or a total of eight bottles at a time.

The horizontal orientation is used as a matter of convenience by industry, but such orientation is difficult to handle in a bottle by bottle handling mode. The filled bottles and accompanying crates are stored on top of each other horizontally. The full bottles are pulled horizontally from a stacked crate. This can be difficult as well as cumbersome. Pulling heavy full bottles horizontally encounters high friction and is awkward at best. Also, the empty bottles are returned to their source on a hand truck stored horizontally.

In the folding tray truck, crates are not used. In this case, the bottles so stored may easily fag off the hand truck during transport, creating problems for the delivery person. Also the horizontal bottles are longer than the hand truck width and protrude therefrom. Such protruding bottles may catch on adjacent structures and fall off the hand truck during transport due to vibrations or bumping into objects. Further, the latter transport truck does not use crates, such that the bottles may be stored on a floor without crates in the horizontal orientation. This requires pulling the bottles horizontally from the stack with bottles stored on top. As the bottles are emptied, they are stored on top of the full bottles which need to be pulled horizontally from beneath the stack. This too is awkward for the user and potentially injurious to a person during such pulling action. Also, the stop slide kit may make it more difficult for the delivery person to slide the bottles off of the tray in folding tray hand truck.

U.S. Pat. No. 4,865,202 discloses a mobile extra display module for storing, transporting, and displaying a quantity of containers such as the commonly used 2 liter PET beverage bottles used for soda and the like. The module has a base which is a pallet A plurality of tier sheets are used alternating with layers of the stored containers. The tier sheets have recesses for receiving the bottoms of the containers and recesses for receiving the container tops.

The bottles are arranged in columns and rows along the base and tier sheets. There are four containers in each row and eight bottles in each column. The rows are normal to the columns. However, 2 liter bottles are much smaller than 5 gallon water bottles, and further, the pallet base is not suitable for use with conventional 5 gallon water bottles transport hand trucks. The pallet base disclosed is of the type that is used with fork lift trucks not suitable for delivery of 5 gallon water bottles to offices and the like in which water coolers are located. The pallet base and tier sheets are not disclosed as usable with such 6 gallon water bottle hand trucks. However, the configuration of the pallet base and tier sheets is not satisfactory for use with 5 gallon bottles as the bottles are too large to be placed on the conventional hand buck even in two abreast row orientations, as such two abreast rows would extend the bottles overhanging the edges of the conventional hand truck for water bottles. Such overhang is believed undesirable by the present inventor.

U.S. Pat. No. 5,360,112 also discloses a device for use with pallets for conventional 2 liter PET soft drink bottles. The bodes are stored in plastic compartments in a two by four arrangement. Four rows of bottles are stored on a bottom pallet. A row may have ten containers with eighty bottles in a row and 320 bottles stored between pallets. Panels are provided between an upper pallet and an arrangement of stored containers there beneath. The panels each have recesses for receiving the container bottoms and recesses for recent the container top face of the caps or the peripheral edge of the mouth of an empty container. The panels when not used with containers may themselves be stacked. This arrangement of panels and pallets is not suitable for 5 gallon water bottles for reasons similar to those discussed above in regard to U.S. Pat. No. 4,865,202.

U.S. Pat. No. 3,995,749 discloses a beer keg pallet not suitable for use with water bottle hand trucks. The kegs are stored in columns and rows of two kegs each with the columns and rows normal to each other. In such an arrangement, two 5 gallon bottles stored abreast would overhang the conventional hand truck and not be suitable as discussed above. Dividers depending from the pallet in the form of legs suitable for supporting a pallet on the floor are also disclosed for separately engaging the tops of each of the kegs. The pallets also have a flat deck bounded on two transverse sides by edge portions for retaining the loaded kegs via their bases on the pallet.

U.S. Pat. No. 4,516,677 discloses a modular pallet and shipping tray for transporting yarn packages having tubular cores. The pallet includes a repeating pattern of nubs upstanding from the top surface and a repeating pattern of depressions tracking the nub pattern on the bottom surface. These pallets are not suitable for storing water bottles and even if arranged for storing water bottles, the packages are stored in columns and rows normal to the columns unsuitable for use with conventional water bottle hand trucks for reasons discussed above.

U.S. Pat. No. 5,144,897 discloses a shipping wooden pallet is removably attached to a tray having the same shape and dimensions as the pallet for receiving barrels. The tray has a central upstanding abutment. There are also four corner abutments at a wall portion along the tray periphery and a central abutment at the wag periphery between the corners. The abutments are shaped to form recess for receiving the barrels therebetween. The wall portion is to retain liquid leaks from the barrels onto the tray from seeping off the tray. The various abutments have arcuate surfaces for receding the arcuate surfaces of the barrels. The barrels however are arranged in columns and normal rows abreast of each other not satisfactory for 5 gallon water bottles as discussed above.

U.S. Pat. No. 5,038,981 discloses trays for holding a forest of bottles such as two liter PET bottles and is deficient for 5 gallon water bottles for reasons similar to the above discussed two liter bottle pallet patents.

U.S. Pat. Nos. Des. 327,970; 4,653,651; 4,1801,024; 6,073,530; 4,344,530; 4,162,738; 5,377,862 and 4,700,837 disclose various bottle stacking arrangements which suffer from the same or similar disadvantages as the pallets and trays of the patents discussed above.

The present inventor recognizes a need to solve the above problems, which need is addressed by the present invention. In particular, a need is seen for using the present three position truck in a different manner than that suggested by the truck supplier to alleviate the awkwardness of the suggested use. Also, a need is seen to permit the commercially available hand truck to deliver more bottles at a time, making delivery transport more efficient. As a result, stored bottles are easily lifted from the storage rack apparatus of the present invention, and will not fall off the stored racks either during storage by a user or during transport on a hand truck such as might occur with the three position hand truck None of the prior art discussed above recognize either the problem or solution in the handling of present fire gallon water bottles with commercially available water bottle hand trucks. Typical soft drink two liter bottle pallets are generally disclosed for use with fork lift trucks for delivery to and into stores and the like rather than offices in which water coolers are located, which offices typically require the use of hand trucks.

A bottled water apparatus according to the present invention is for storing and transporting water bottles on a hand truck having bottom rails on which the bottles are to be stored during transport, the bottles have a bottom wall, an annular side wall and a pouring spout on a neck attached to the side wall distal the bottom wall. The apparatus comprises a first bottom rack for receiving and storing a staggered first array of bottles in a longitudinal direction upright with respect to the force of gravity. The first is rack is for storing the bottles in multiple columns in the longitudinal direction and rows transverse to the longitudinal direction in the array, the bottles in each column being aligned longitudinally, the bottles in adjacent columns being staggered with respect to each other so that the rows are aligned inclined to the longitudinal direction. Bottle support and divider means align and support the bottles in the array.

As a result of the staggering of the rows inclined relative to the column directions, the bottles and racks on the hand truck exhibit minimum transverse dimension that do not extend beyond the wheels of the truck. This arrangement is safer and more convenient than conventional horizontal delivery modes, and additionally, permits more bottles to be delivered at a time by the hand truck. For example, sixteen water bottles can be stored and transported at one time on a conventional hand truck with the apparatus of the present invention as compare to the eight maximum bottles transported by conventional delivery modes with the same hand buck with prior art crates.

In a further aspect, a second top rack is arranged to receive the necks of the bottles in the staggered array.

In a further aspect, the bottles are each of a given diameter, the adjacent columns being arranged so that the transverse dimension of two adjacent columns normal to the longitudinal direction is less than twice the diameter of a bottle.

In a further aspect, the first rack is formed with a plurality of depending ribs for mating with the hand truck jails to preclude horizontal displacement of the first rack on the hand truck during transport.

In a further aspect, the apparatus includes a third rack comprising the first and second racks attached to each other in abutting relation, the third rack for receiving and storing a second array of said bottles in said staggered arrangement on top of the first array, the third rack for engagement with and receiving the necks and spouts of the bottles in the first array. Preferably, the first and second racks are molded one piece to form a composite rack.

In a further aspect, the second rack has a plurality of recesses for receiving and mating with the depending ribs in the first rack.

In a further aspect, the second rack comprises a substantially planar central portion surrounded by an upright rail at the periphery of the planar central portion.

In a further aspect, a third rack is included comprising the first and second racks attached to each other in abutting relation, the third rack for receiving and storing a second array of said bottles in said staggered arrangement on top of the first array, the third rack for engagement with and receiving the necks and spouts of the bottles in the first array, the first rack having a peripheral recess for receiving the rail.

In this arrangement, the bottom and top racks of different configurations are combined to form a central rack that performs the functions of the top and bottom racks without the expense of making all of the racks of the same more complex configuration for accommodating both the bottoms and tops of the water bottles.

In a further aspect, the first rack comprises a planar bottom wall, an annular upright rail extending from the periphery of the planar bottom wall, and a plurality of upright bottle support members extending from the planar bottom wall, the support members defining an axis parallel to the planar bottom wall, the axis being inclined relative to the longitudinal direction. The inclined axis permits the staggered arrangement of the bottles as described above.

In a further aspect the support members are approximately hour glass shape with opposing concave surfaces for receiving the bottle side walls is juxtaposed therewith.

In a further aspect, the support members are disposed medially on the planar bottom wall.

In a further aspect, the first rack comprises a planar bottom wall and an annular peripheral rail, the first rack including a plurality of spaced bottle support members upstanding from the bottom wall and attached to the rail, the spaced support members being generally frustoconical in plan view in a direction normal to and toward the planar bottom wall.

In a further aspect, the first rack comprises a planar bottom wall and an annular side rail extending from the planar bottom wall periphery, the apparatus including a plurality of like bottle central support members arrayed generally centrally the planar bottom wall in the longitudinal direction and a plurality of side support members arrayed along and attached to the annular side rail and upstanding from the planar bottom wall.

In a further aspect, the planar bottom wall has a plurality of depending ribs for engagement with the hand truck rails to preclude horizontal displacement of the first rack relative to the hand truck rails.

In a further aspect, the first and second racks are bonded to each other.

In a further aspect, a water bottle racking apparatus for use with a hand truck having a plurality of bottle supporting rails, the bottles having a bottom section and a top neck section comprises a first bottom rack with a plurality of ribs depending from a bottom wall thereof for mating with the hand truck rails to preclude displacement of the fit rack relative to the hand truck during transport, the first rack including a plurality of bottle support members upstanding from the first rack bottom wall opposite the ribs for laterally supporting the bottle bottom sections. A second top rack includes depending bottle lateral support members for overlying the bottles and arranged for receiving the necks and tops of the bottles.

In this way, the bottles stored staggered upright on the hand truck do not occupy a space that is significantly greater than the hand truck and which staggering reduces the transverse dimension of multiple columns of stored bottles. The racks may also be used to store the bottles on a floor for use by the user of the water. By connecting the top and bottom racks together, an intermediate rack is formed which sits on top of a lower array of bottles and stores thereon an upper array of bottles. As many arrays as desired can be stored on a hand truck, preferably two arrays. The top rack preferably has a rim to serve as a storage tray for packages as the water bottles are transported.

BRIEF DESCRIPTION OF THE DRAWING

FIG. 5i is an end elevation view of the rack of FIG. 3;

Figure 1:
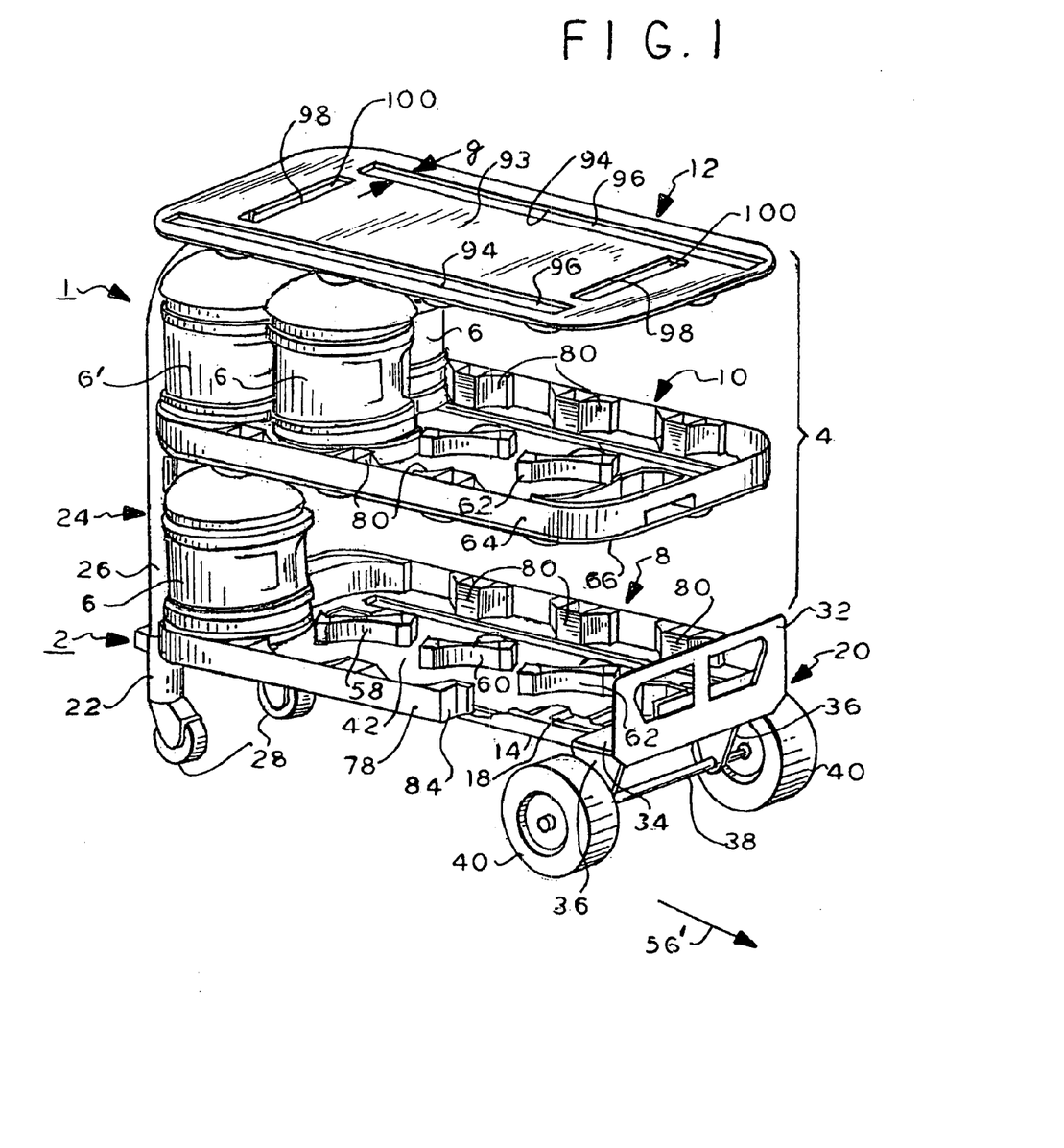
FIG. 1 is an isometric view of a hand truck employing three racks and five gallon water bottles for transport, the racks illustrating only three bottles for simplicity of illustration, according to the present invention.
Figure 2:
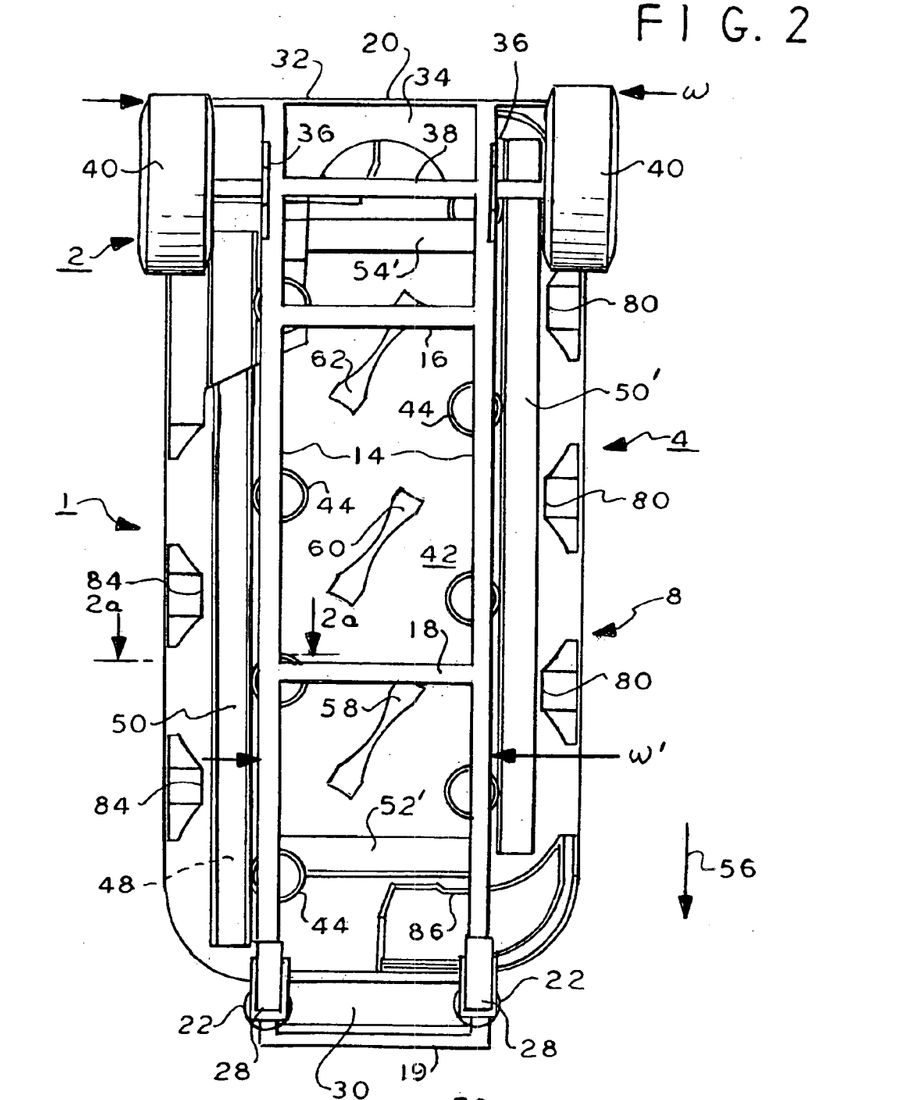
FIG. 2 is a bottom plan view of the truck and rack embodiment of FIG. 1.

In FIGS. 1 and 2, a hand truck, bottle and rack assembly 1 comprises a conventional Magliner™ hand truck 2 carrying rack apparatus 4 according to an embodiment of the present invention. The apparatus 4 is shown carrying four conventional five gallon water bottles 6 for illustration. Such an arrangement would not be used at the upper rack could not be supported by the illustrated lower bottle array. In practice, there are eight bottles 6 on the bottom rack 8 and eight bottles 6 on the intermediate rack 10 during transport by the truck 2. The rack apparatus 4 comprises three racks, bottom rack 8, intermediate rack 10 and top rack 12. The bottom and intermediate racks, 8 and 10, respectively receive the bottles 6 thereon. The top rack 12 receives the spouts and upper portions of the bottle 6 necks on the underside of the rack 12 and serves as a storage tray for packages during transport. No bottles are stored on the top rack 12.

Truck 2 comprises a plurality of tubular rectangular in section metal longitudinal rails 14 interconnected to transverse tubular rectangular in section metal rails 16,18 and 19 and connected to sheet metal front L-shaped member 20. A pair of caster and handle cylindrical hollow supports 22 are connected to the rails 14. Upright U-shaped handle 24 formed of bent tube is attached to the supports 22 at each leg 26 (one being shown). Front casters 28 are also attached to the supports 22. A brace 30 is connected to the supports 22. The rails 14, 16 and 18 form a support platform for the rack apparatus 4. The longitudinal rails 14 may be identical and the transverse rails 16 and 18 may also be identical. The member 20 has an upright leg 32 and a horizontal leg 34, the legs being so oriented in the transport mode shown in the figures. The handle 24 may be folded aligned parallel with the platform formed by the rails 14, 16, 18 and 19. In this orientation, the rails 14, 16, 18 and 19 may be lifted to a vertical orientation by use of the handle whereby the leg 32 is tilted to the horizontal and the leg 34 is tilted upwardly toward the vertical for transporting other types of goods carried by and supported by the legs 32, 34 and the rails.

Gussets 36 are attached to the leg 34 for carrying an axle 38. Rear wheels 40 are attached to the axle 38. The handle 24 defines the front of the truck in this orientation. The rear wheels 40 define a transverse width dimension w. The rails 14 define a transverse width dimension w'. This truck as described above is conventional and commercially available in use carrying five gallon water bottles as described in the introductory portion. The rack apparatus 4 is arranged to be carried by the truck 2, and can carry as many as sixteen five gallon water bottles as compared to the eight bottles using the prior art crates.

Figure 2A:
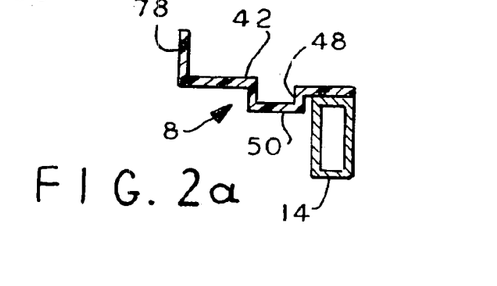
FIG. 2a is a sectional end elevation view of a representative rack depending rib and hand truck support rail relationship to preclude significant horizontal rack displacement during transport taken at lines 2a—2a of FIG. 2.
Figure 10:
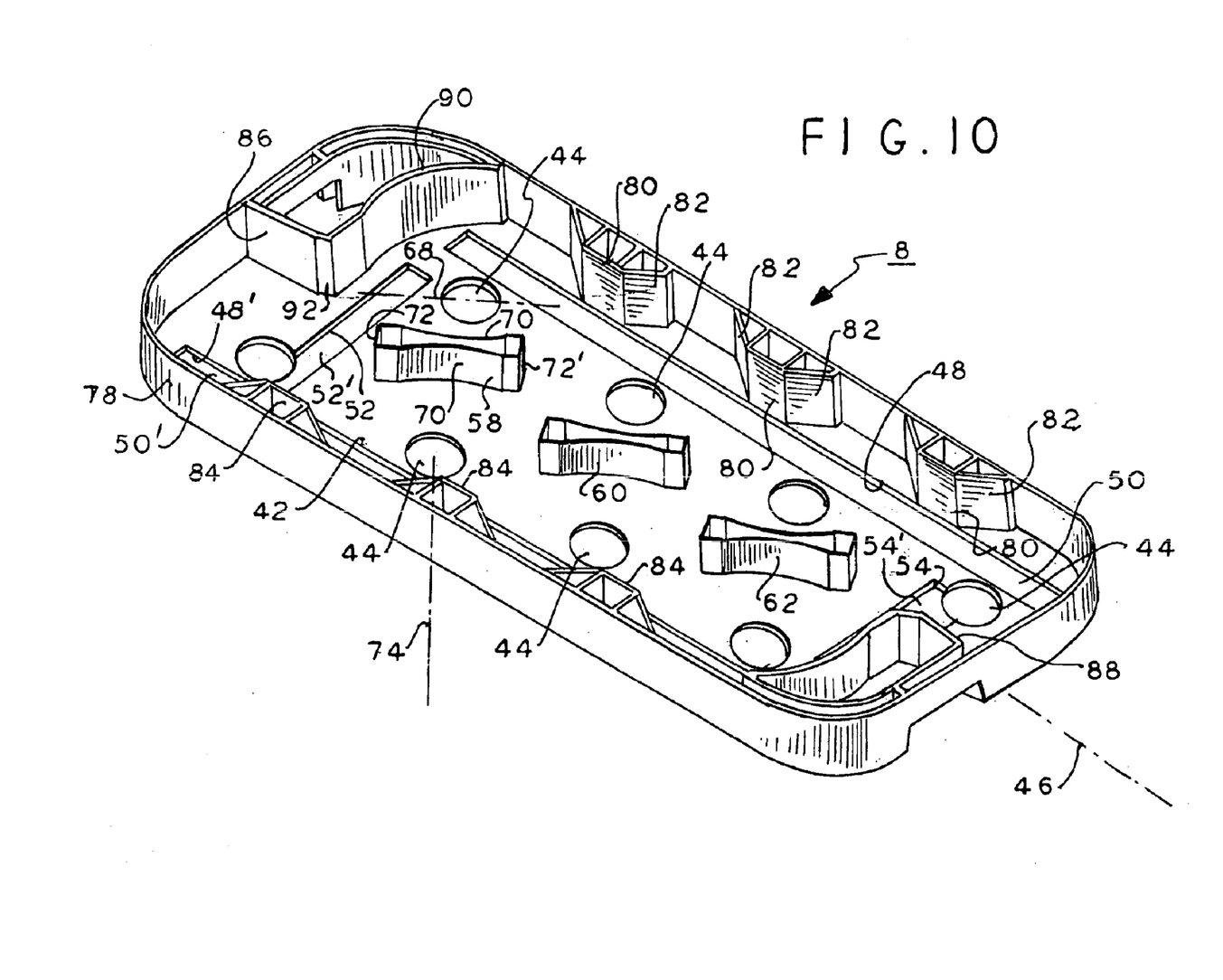
FIG. 10 is an isometric view of the bottom rack of FIG. 8.

In FIG. 10, the bottom rack 8 of apparatus 4, is molded, preferably injection molded thermoplastic material, but may be thermoformed or molded of thermoset plastic. The rack 8 is identical to the rack 10 upper rack portion 64 of the intermediate rack 10, FIGS. 4 and 8, and a description of rack 8 is representative. Rack 8 comprise a bottom planar platform 42 of uniform thickness with a plurality of through openings 44 arranged in an array, each opening corresponding to the center of a bottle of the array of bottles 6 to be stored on the rack 8. The platform 42 has a central longitudinal axis 46. A longitudinal recess 48 is formed in the platform 42 on one side of the axis 48 and corresponds to a depending rib 50, as best seen in FIG. 2a. The recess 48 and rib 50 are rectangular.

A second recess 48' of the same transverse dimension as recess 48 and a second depending rib 50' of the same transverse dimension as rib 50 is formed in the platform 42 on the opposite side of and symmetrical with the axis 46 as recess 48 and rib 50. The recesses 48 and 50 are parallel.

A transverse rectangular recess 52 is formed in the platform 42 adjacent one end of the platform and a second rectangular transverse recess 54 is formed in the platform 42 adjacent the other opposite platform end. A rectangular rib 52' depends from the platform 42 corresponding to the recess 52 and associated therewith. A rectangular rib 54' depends from the platform 42 corresponding to the recess 54 and associated therewith. The recesses 52, 54 and corresponding ribs 52', 54' are parallel to each other and normal to the recesses 48, 48'. The transverse recesses and ribs have the general transverse cross section configuration and dimensions of the recess 48 and rib 50, FIG. 2a. The recesses 52 and 54 are disposed between normal to and spaced from the recesses 48 and 48'.

The ribs 50 and 50' are located so as to be exterior the truck rails 14 as shown in FIGS. 2 and 2a. These ribs depend juxtaposed with these rails serving as a stop to preclude the rack 8 from sliding off of the rails 14, 16 and so on during of the racks and stored bottles 6. Similarly, the transverse ribs 52' and 54', FIG. 2, depend juxtaposed with transverse rails 16 and 19 and brace 30 to preclude the rac 8 from sliding off of the truck rails in the transverse and longitudinal direction 56 parallel to axis 46 (FIG. 10). The transverse ribs also are disposed between the truck 2 rails 14 for precluding transverse displacement of the lower rack 8, and thus the entire rack apparatus 4, relative to the truck rails 14 can not displace off of the truck rails due to vibration during transport The truck upstanding leg 32, FIG. 1, precludes the lower rack 8 from sliding off of the truck in the longitudinal axial direction 56'. Thus, the depending ribs 50, 50', 52' and 54' cooperate with the truck rails to retain the bottom rack 8 on the truck platform comprising rails 14, 16, 18 and so on.

Figures 3, 3A, 4, 5:
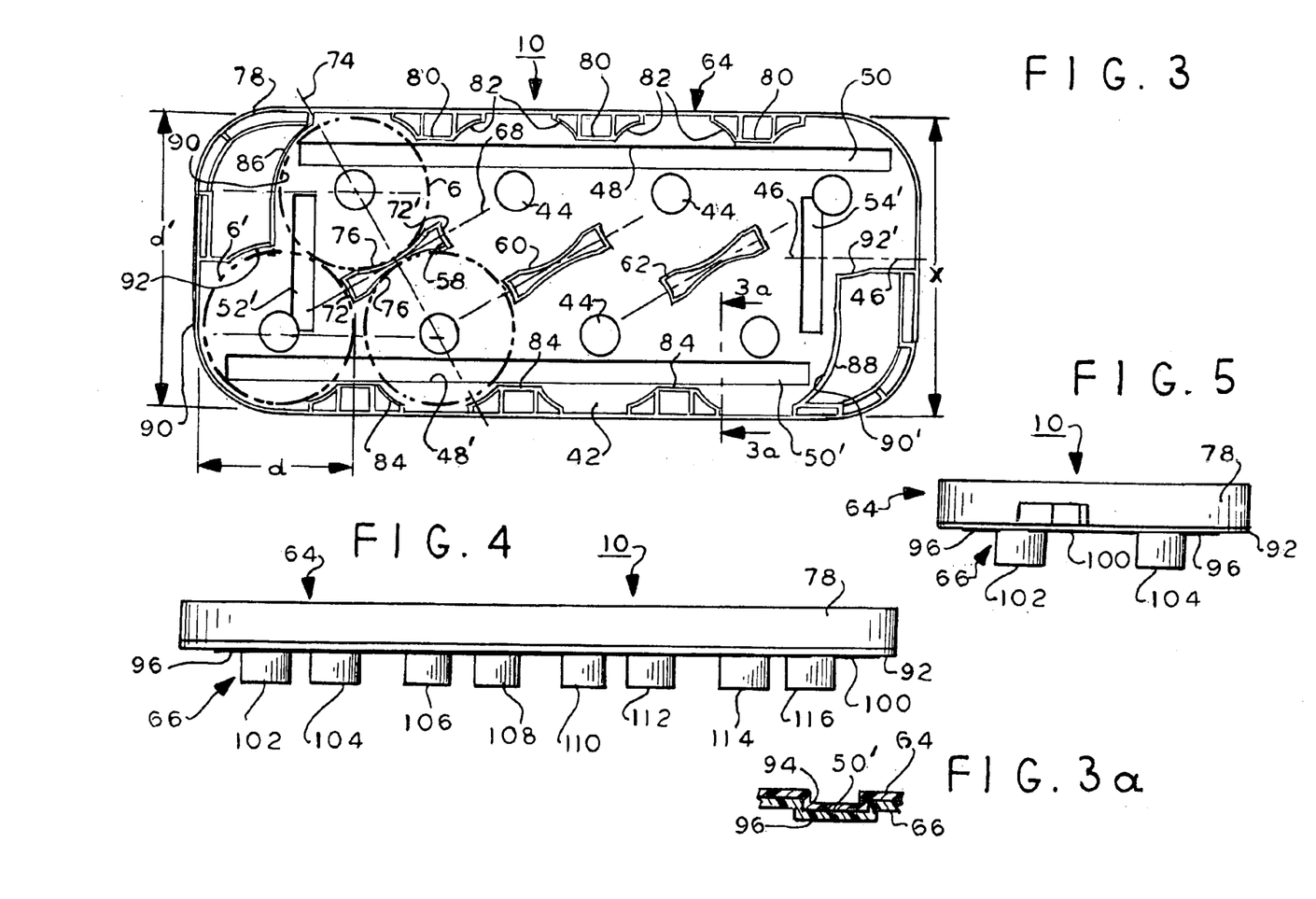
FIG. 3 is a top plan view of the embodiment the intermediate rack of FIG. 1 with representative three bottles shown in phantom to show their stored relationship on the rack.
FIG. 3a is a sectional end elevation view of a representative intermediate rack showing the rib and groove relationship of the mating bonded bottom and top racks taken at lines 3a—3a of FIG. 3.
FIG. 4 is a side elevation view of the rack of FIG. 3.

Rack 8, FIG. 10, has medial bottle dividers and supports 58, 60 and 62 which are identical and a description of support 58 is representative. In FIG. 3, rack 10 comprises upper portion 64 and lower portion 66. Rack 10 is formed by bonding upper rack portion 64 identical to rack 8 to lower rack portion 68 identical to rack 12. Therefore, the top plan view of FIG. 3 of rack 10 is identical to the top plan view of the lower rack 8, FIG. 10. In the various figures, identical parts have the same reference numerals.

In FIG. 3, rack portion 64 support 58 lies on an axis 68 which is inclined to longitudinal axis 46, preferably about 45°. All of the support 58, 60 and 62 lie on axes parallel to axis 68 and lie aligned on centrally on longitudinal axis 46 as shown, FIG. 3. Support 56 is hourglass shaped with mirror image concave curved surfaces 70 on opposite sides. Surface 70 abuts a received bottle as shown by one of the phantom bottles 6, FIG. 3. The end edge surface 72 of support 58 is also concave curved for abutting the outer surface of another bottle 6'. The support 58 edge surface 72' opposite surface 72 also abuts a different received bottle 6 (not shown in FIG. 3). Thus all side surfaces of the divider support 58 abut the curved outer surface of a different received bottle 6. This configuration is present on all of the supports 58, 60 and 62 of the racks 8 and 64. Two bottles 6, FIG. 3, lie on axis 74 inclined relative to the longitudinal axis 46.

Because of this inclination of the transverse array of bottles 6, FIG. 3, on axis 74, compact storage of the eight bottles stored on the rack 84 (and rack 8, FIG. 10) is provided. The bottles 6 all have a diameter d. The stored array of bottles have a combined transverse dimension d' normal to longitudinal axis 46. Dimension d' is less than 2d, so that the transverse width X, FIG. 3, of the rack 64 (and rack 8, FIG. 10) can be less than 2d. This permits the rack 64 traverse width X to be less than or no greater than the width w, FIG. 2, of the rear wheels 40 of the truck 4.

This configuration provides a compact arrangement of the transported bottles that permits the truck to traverse narrow passages not otherwise possible with the bottles stored horizontal as in the prior art. That is, the bottles stored in transverse arrays abreast of each other on an axis that is normal to the truck longitudinal axis 46 as disclosed by the prior art patents in the introductory portion results in the stored bottles taking up more real estate and extend beyond the truck platform and thus may catch on external object in the path of the truck during transport. Also, more bottles, sixteen as compared to the prior art eight, for example, can be transported on the same truck as before, but able to traverse narrower passages and present less hazardous overhang of the bottle spouts as in the prior art. This is a significant advantage over the prior art racks and storage systems.

All of the bottles 6 in the transverse arrays are thus stored in row arrays of two bottles each inclined to axis 46 parallel to axis 74, FIG. 3. While axis 74 is preferably at 45° to axis 46, it may be other angles according to a given implementation. The bottles in the two columns are thus staggered in the transverse directions normal to axis 46. The stored bottles are axially aligned in two parallel columns in the longitudinal direction of axis 46.

The compact arrangement is provided by positioning two bottles 6, 6', FIG. 3, to be closely spaced at one peripheral bottle surface location abutting the support 58 end surface 72 (bottle 6') while permitting the other two bottles 6 to abut the support 58 side surfaces 76, 76'. This staggered alternating bottle transverse pattern in the longitudinal direction of the two columns of bottles is repeated for the remaining bottles as evident from the location and configuration of the supports 58, 60 and 62 and phantom bottles 6 and 6'.

The term column herein means the array of bottles parallel to the longitudinal axis 46. The term staggered means that the bottles in the two columns on opposite sides of the axis 46 are at different dimensions along the longitudinal axis 46 from a reference point such as the edge 90 of rack 64, FIG. 3. That is, the center of the bottles in the two columns lie on different transverse axes normal to axis 46, with the center of the bottles as defined by the center of openings 44 in one column alternating with the centers of the bottles in the other column progressing from the edge 90. The term row means the aligned bottles transverse to the axis 46. Thus the two bottles 6, FIG. 3, on axis 74 are aligned with each other and form a row.

The rack 8, FIG. 10 has further bottle supports 80 attached to annular upstanding side rail 78. Side rail 78 extends upstanding about the periphery of the platform 42. The supports 80 are somewhat frusto-conical in plan view of FIG. 3 with curved opposite concave surfaces 82 that abut adjacent bottles 6 convex surfaces. Each surface 82 abuts the side of the corresponding bottle 6 as shown in FIG. 3.

A further array of supports 84 identical to supports 80 are at side rail 78 on a side of the platform opposite the supports 80, and positioned staggered with respect to the supports 80 in the longitudinal direction of axis 48. Two end supports 86 and 88 abut the end bottles 6 stored on the rack 8. End support 86 has two concave surfaces 90 and 92. Surface 90 abuts a bottle 6 and surface 92 abuts bottle 6', FIG. 3. The bottle 6' also abuts the side rail 78 at a corner if. Support 88 has two concave surfaces 91' and 92' for abutting adjacent bottles 6 in the same fashion as support 86 at the opposite end of the rack 10.

Figure 6:
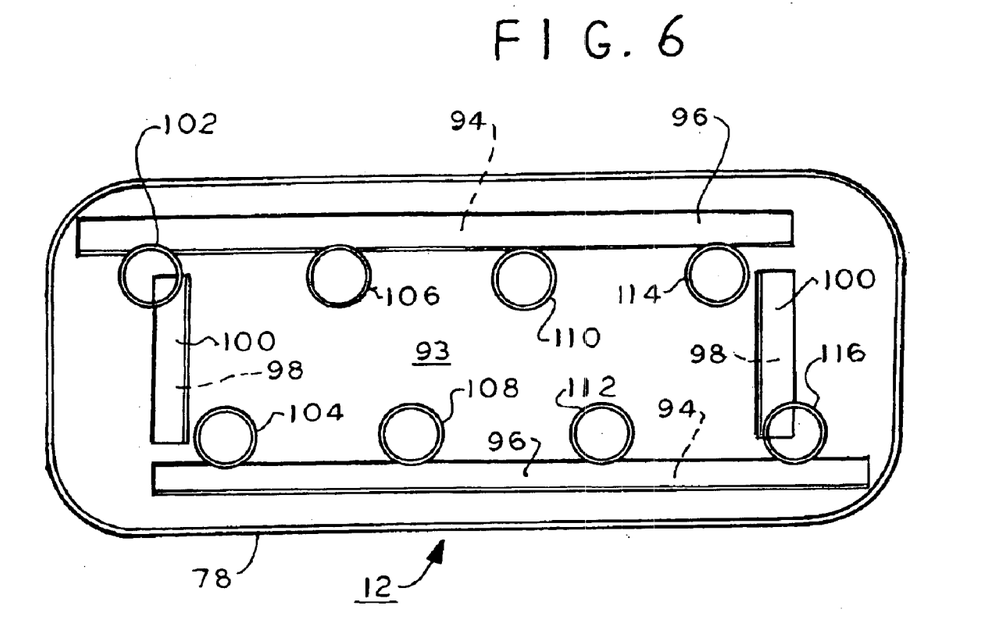
FIG. 6 is a bottom plan view of the rack of FIG. 3.
Figure 7:
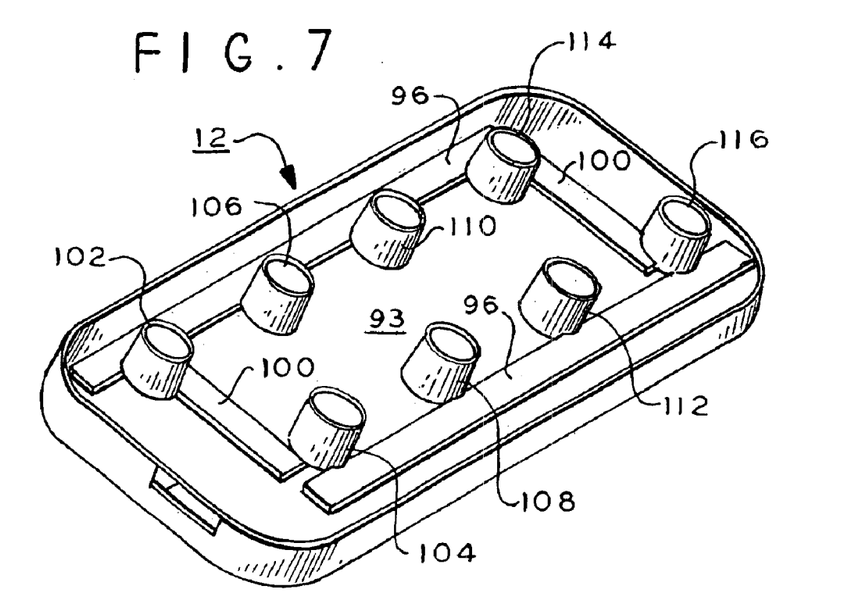
FIG. 7 is an isometric view of the rack of FIG. 6.
Figure 8:
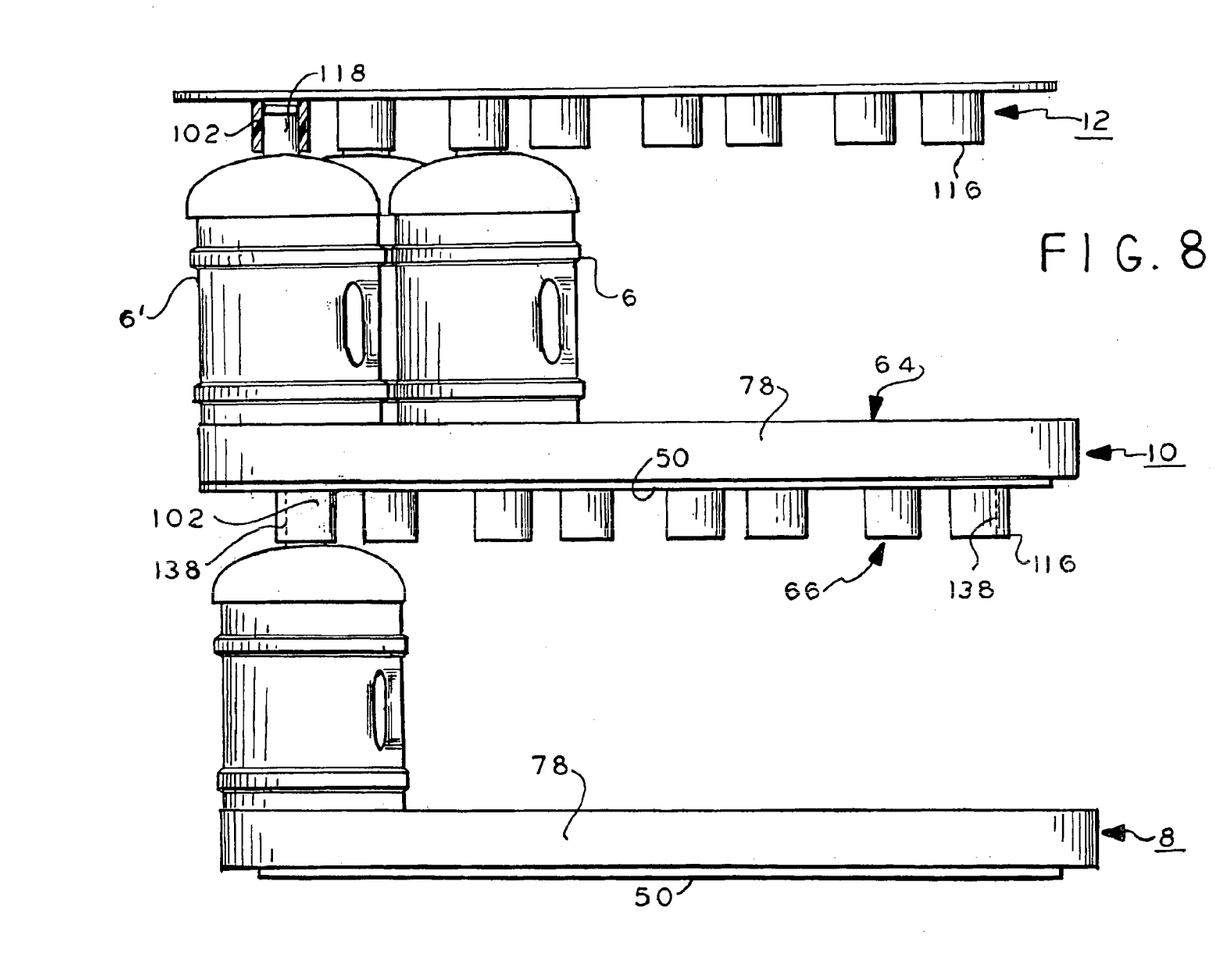
FIG. 8 is a side elevation view of the three racks and bottles of FIG. 1 without the hand truck.

Top rack 12, FIGS. 1, 6 and 8, has the same outer peripheral shape and dimensions as bottom rack 8 and upper rack portion 64 of the intermediate rack 10 and is identical to the rack 10 lower rack portion 66. Therefore, a description of rack 12 is representative of rack 66. The top rack 12, FIG. 1, comprises a planar platform 93 of uniform thickness and is preferably molded thermoplastic material. Rack 12 has two longitudinal recesses 94 which form depending ribs 96. The positions of the recesses 94 and ribs 96 are the same as the ribs and recesses in the rack 8 (and rack 64). The recesses 94 have a transverse dimension 9, FIG. 1, dimensioned sufficient to receive one of the ribs 50, 50' of the rack 64, FIG. 3a. The rack 12 has two transverse recesses 98, FIG. 1, corresponding to ribs 100 depending from as the platform 92. These recesses 98 are dimensioned to receive the ribs 52' and 54' of the intermediate rack 64. These relative dimensions are complememtary.

An array of eight circular cylindrical members 102, 104, 106 and so on depend from the platform 92. The members 102, 104 and so on are disposed in the identical array as the openings 44, FIG. 3, in the rack 8 (and in the rack 10 upper portion rack 64, FIG. 4). The members 102, 104 and so on each receive the neck and spout 118 of a corresponding bode stored on the intermediate rack 10 therebeneath as best seen in FIG. 8.

Figure 9:
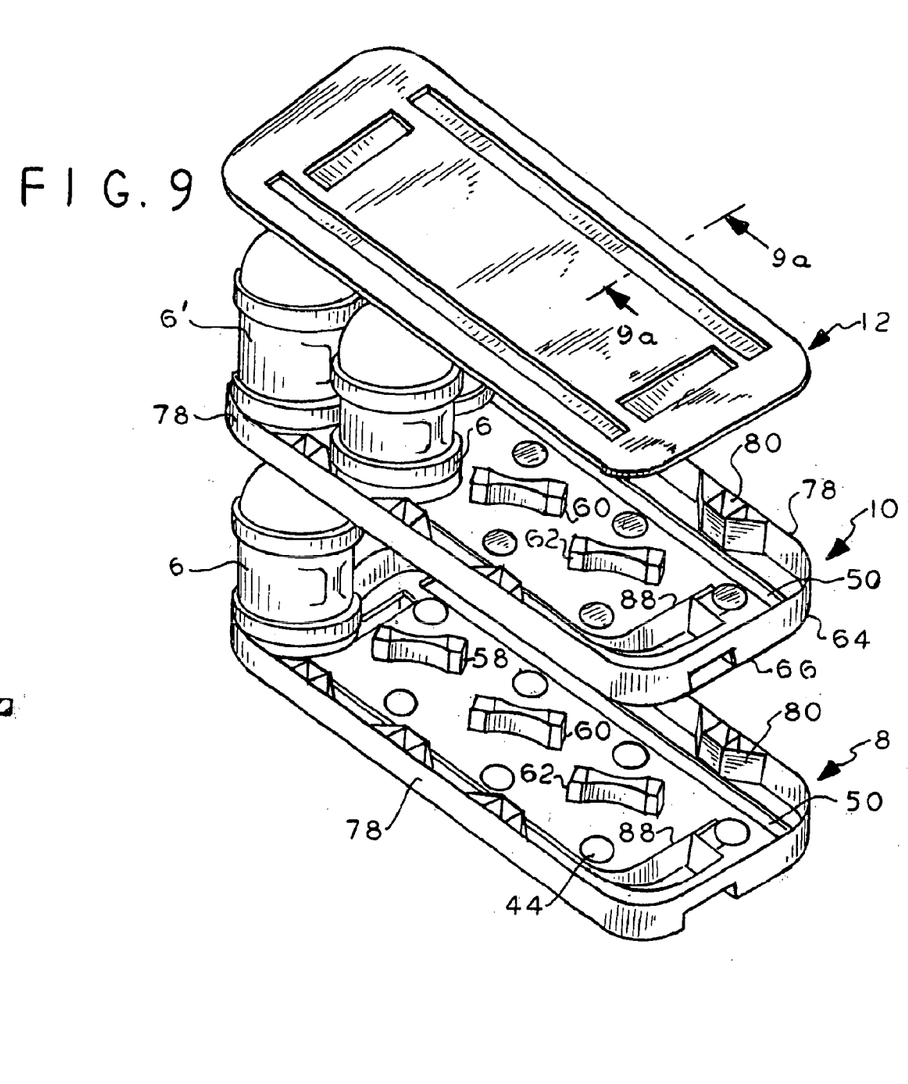
FIG. 9 is an isometric view of the racks and bottles of FIG. 8.
Figure 9A:
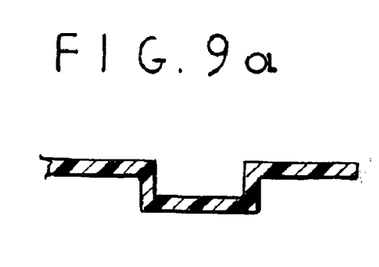
FIG. 9a is a sectional view of the top rack of FIG. 9 taken along lines 9a—9a showing a representative recess and associated depending rib on each of the racks.

The ribs of the rack 12 are dimensioned to be complementary of the rib recesses of the intermediate rack 10 upper portion 64 as noted above. Since rack 10 upper portion 64, FIGS. 1, 4 and 9, is identical to rack 8, its description will not be given. The lower rack portion 66 of rack 10 is identical to rack 12 as also noted above. To form the rack 10, the upper rack portion 64 is bonded, e.g., sonic welded, to the lower rack portion 68. The ribs 50, 50' of rack portion 64 are dimensioned to fit inside of the recesses 94 of rack portion 66 corresponding to rack 12. Thus the ribs of upper portion 64 interengage with the recesses of lower portion 66, FIG. 3, to form the unitary rack 10. The rack 10 has the configuration of both racks 8 and 12. The lower rack portion 66 members 102, 104, 106 and so on receive the neck and spouts 118 of the bottles stored on the lower rack 8. FIGS. 1, 8 and 9. The members 102 and so on laterally restrain the bottles 6 at the spouts during transport as do the supports on the rack 8 and portion 64. The complementary ribs and recesses of the rack 10 upper rack portion 64 and lower rack portion 66 assist in laterally restraining the two portions after bonding to increase their combined strength and also stiffen the structures. The ribs in each rack also stiffens the corresponding rack In operation, the rack 8, FIG. 1, is placed on the hand truck platform and its ribs engaged with the truck to cooperate with the truck rails to preclude horizontal displacement of the rack 8 on the truck. Eight fill bottles 6 are then placed on the rack 8. The int iate rack 10 is placed with its members 102 and so on receiving the spouts and necks of the loaded bottles 6. The bottles on the lower rack 8 support the rack 10. Eight more bottles are loaded on the rack 10 upper rack portion 64 in the same array as on rack 8. The top rack 12 is then placed on the loaded bottles on rack 10 with the members 102 and so on engaged with the necks and spouts of this intermediate array of bottles 6. The top rack may serve as a tray for transporting packages placed thereon.

During storage of the bottles at a user's facility, the racks 8, 10 are used to store the bottles removed from the hand truck. The top rack 12 is optional in such use. Because the bottles are all vertically oriented, it is easier to remove and place the bottles from and on the racks as compared to the horizontal orientation of the prior art system for five gallon water bottles. Also the tuck capacity is increased significantly.

Figure 11:
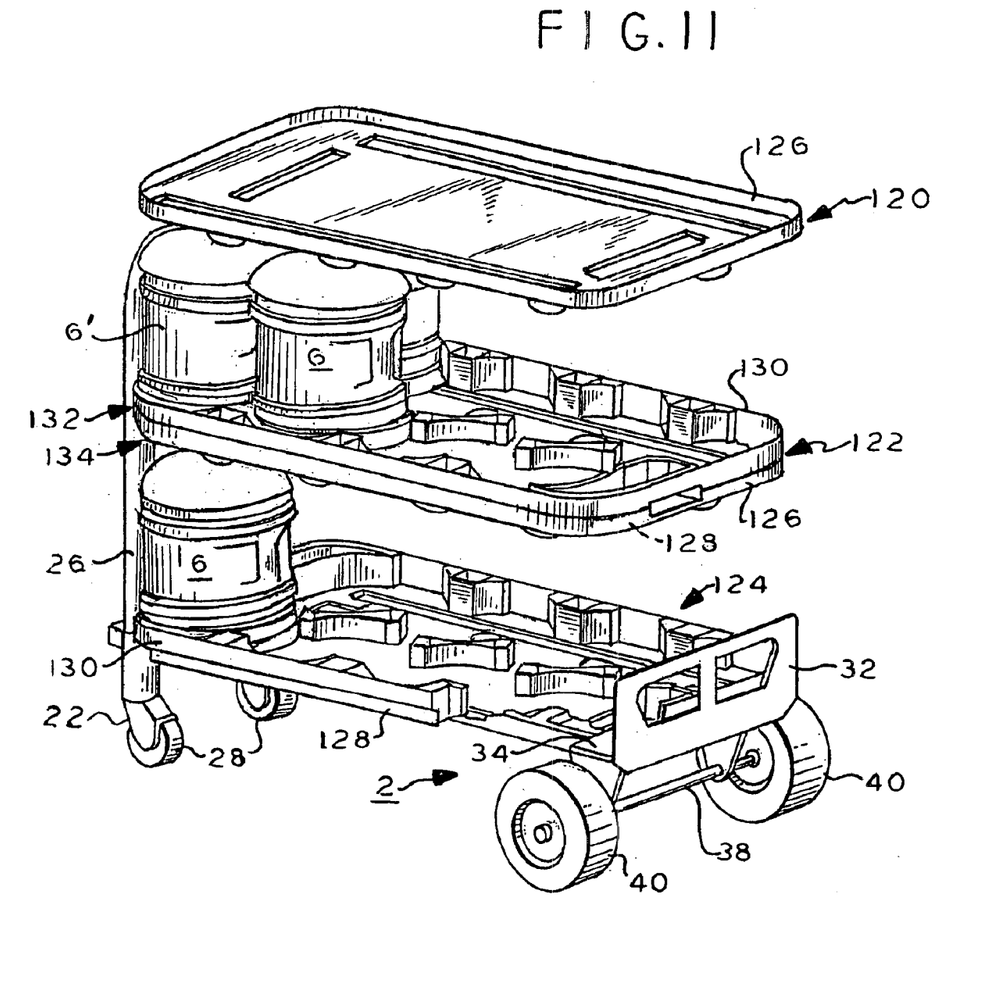
FIG. 11 is an isometric view similar to the view of FIG. 1 of an alternate embodiment of the rack apparatus of the present invention as used with a hand truck.
Figure 12:
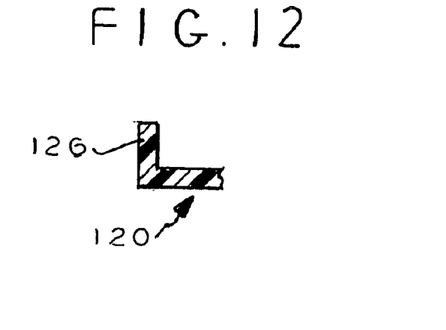
FIG. 12 is a sectional elevation view of the peripheral edge of the top rack of FIG. 11.
Figure 13:
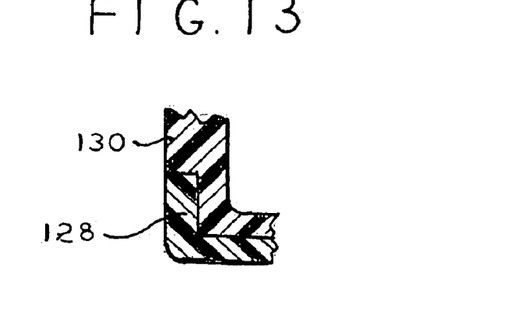
FIG. 13 is a sectional elevation view of the peripheral edge of the intermediate rack of FIG. 11.

In an alternative embodiment in FIGS. 11–13, truck 2 receives three racks 120, 122 and 124 as in the embodiment of FIG. 1. The rack 120 is substantially the same as rack 12 except rack 120 has an annular upstanding rail 126 at its peripheral edge. Rack 124 is substantially the same as rack 8 of FIG. 1 except it has a recess 128 at its lower peripheral region of the annular rail 130. Rack 122 has upper rack portion 132 and lower rack portion 134. Upper portion 132 is identical to rack 124 and lower rack portion 134 is identical to rack 120. The lower rack portion rail 128 mates in the recess 128 of the upper rack portion 132 as best seen in FIG. 13. The rail 126 is shown in more detail in FIG. 12.

There thus has been shown a bottled water apparatus for storing and transporting water bottles on a hand truck having bottom rails on which the bottles are to be stored for transport the bottles having a bottom wall, an annular side wall and a pouring spout on a neck attached to the side wall distal the bottom wall. The apparatus comprises a first bottom rack for receiving and storing a staggered fist array of bottles in a longitudinal direction upright with respect to the force of gravity, the first rack for storing the bottles in multiple columns in the longitudinal direction and rows transverse to the longitudinal direction in the array, the bottles in each column being aligned longitudinally, the bottles in adjacent columns being staggered with respect to each other so that the rows are aligned inclined to the longitudinal direction. A second top rack is arranged to receive the necks and spouts of the bottles in the staggered array. As a result, the bottles are stored vertically with respect to the force of gravity, facilitating the handling of the bottles.

Figure 14:
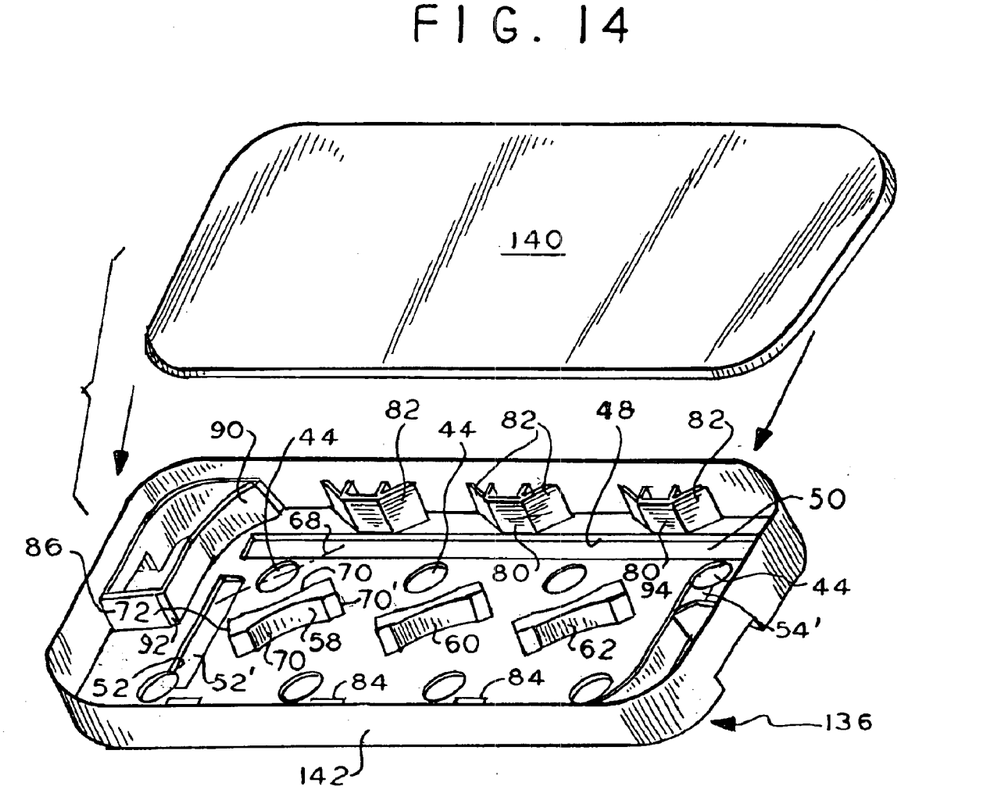
FIG. 14 is an exploded isometric view of a rack according to a further embodiment.

In a further alternative embodiment, FIG. 14, rack 136 comprises a single molded structure having all of the elements of rack 10 except it is formed molded as one piece instead of two racks 64 and 66 as in rack 10. In this case both the top rack 12 and bottom rack 8, FIG. 8 are eliminated and the rack 136 is used solely as a bottom rack laying on top of the hand truck 2, as an intermediate rack in place of rack 10 and as a top rack in place of rack 12, FIG. 8. This arrangement permits one mold to form all three rack.

The rack 136 of FIG. 14 includes the same divider supports 58, 80, 62, 80, 86, 84 and 88 and so on in the same relative orientation and construction as in rack 10 and also includes the same bottle neck and spout support members 102, 104 and so on of the top rack 12. Except, with respect to members 102 and so on, where there may be interference with any of the rails of truck 2, a portion of the members 102 and so on the side walls of the members may be molded out of the configuration so that the members are fragments of frusto-cones. This is determined empirically for a given truck (shown in FIG. 8 as phantom dashed lines 138 on member 102 and member 116, for example, rack 10). A majority of representative member 102 side wall after such fragmentation remains to provide lateral support to the bottle necks and spouts.

Figure 15:
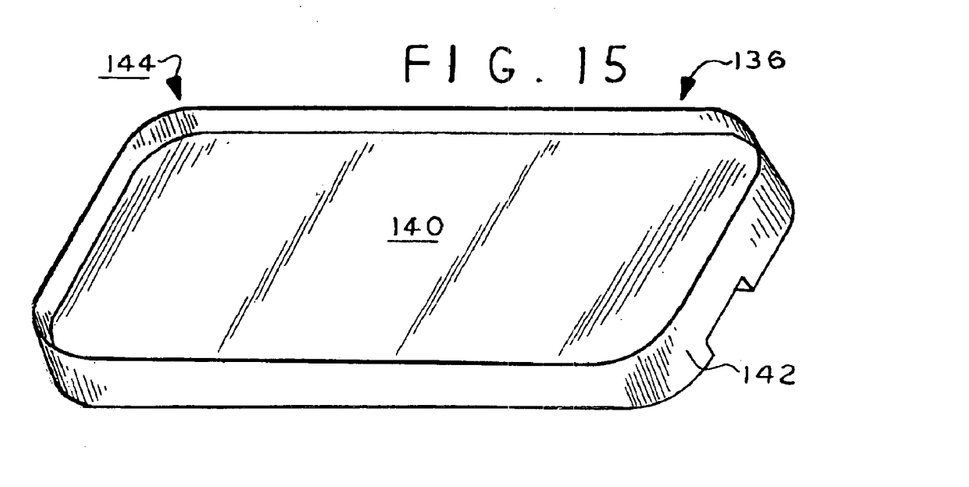
FIG. 15 is an isometric view of the rack of FIG. 14 when assembled to form a top rack of an array of used on a hand truck.

In FIG. 14, a sheet 140 fits within the side rail 142 of the rack 136 and rests on top of the supports 80, 58, 60, 62 and so on. Sheet 140 can be any flat material such as thermoplastic, fiberboard, masonite, wood and so on. This combined rack 136 and sheet 140 forms a top rack in place of the top rack 12. The sheet 140 serves as a storage tray for packages and the like as the hand tuck is transporting the empty or full bottles. This forms a combined structure rack 144, FIG. 15.

The side rail 142 of rack 136 may be the same height as the rail 78 of rack 10, FIG. 10, but the divider and supports 58, 60, 62, 80, 84 and so on may be reduced in height from those in the FIG. 10 embodiment. The ribs and recesses such as ribs 5o remain to cooperate with the depending neck and spout supports for maintaining the lowermost rack in place on the hand truck, but they may be optional in this embodiment.

It will occur to those of ordinary skill that various modifications may be make to the disclosed embodiments. The disclosed embodiments are given by way of illustration and not limitation. The scope of the invention is intended to be defined by the appended claims.

What is claimed is:

1. A bottled water apparatus for storing and transporting water bottles on a hand truck having bottom rails on which the bottles are to be stored for transport, the bottles having a bottom wall, an annular side wall and a pouring spout on a neck attached to the side wall distal the bottom wall, the apparatus comprising:

a first bottom rack for receiving and storing a staggered first array of bottles in a longitudinal direction upright with respect to the force of gravity, the first rack for storing the bottles in multiple columns in the longitudinal direction and rows transverse to the longitudinal direction in the array, the bottles in each column being aligned longitudinally, the bottles in adjacent columns being staggered with respect to each other so that the rows are aligned inclined to the longitudinal direction; and a second top rack arranged to receive the necks and spouts of the bottles in the staggered array.

2. The apparatus of claim 1 wherein the bottles are each of a given diameter, the adjacent columns being arranged so that the transverse dimension of two adjacent columns normal to the longitudinal direction is less than twice the diameter of a bottle.

3. The apparatus of claim 1 wherein the first rack is formed with a plurality of depending ribs for mating with the hand truck rails to preclude horizontal displacement of the first rack on the hand truck during transport.

4. The apparatus of claim 1 including a third rack comprising fourth and fifth racks having the same respective configurations as the first and second racks the fourth and fifth racks being attached to each other in abutting relation to form the third rack, the third rack for receiving and storing a second array of said bottles in said staggered arrangement on top of the first array, the third rack for engagement with and receiving the necks and spouts of the bottles in the first array.

5. The apparatus of claim 4 wherein the fourth and fifth racks are molded one piece to form a composite rack.

6. The apparatus of claim 4 wherein the fourth rack has depending ribs and the fifth rack has a plurality of recesses for receiving and mating with depending ribs of the fourth rack.

7. The apparatus of claim 1 wherein the second rack comprises a substantially planar central portion surrounded by an upright rail at the periphery of the planar central portion.

8. The apparatus of claim 7 including a third rack comprising fourth and fifth racks having the same respective configurations as the first and second racks and being attached to each other in abutting relation, the third rack for receiving and storing a second array of said bottles in said staggered arrangement on top of the first array, the third rack for engagement with and receiving the necks and spouts of the bottles in the first array, the first rack having a peripheral recess for receiving the rail.

9. The apparatus of claim 1 wherein the first rack comprises a planar bottom wall, an annular upstanding rail extending from the periphery of the planar bottom wall, and a plurality of upright bottle support members upstanding from the planar bottom wall, the support members defining an axis parallel to the planar bottom wall, the axis being inclined relative to the longitudinal direction.

10. The apparatus of claim 9 wherein the bottle support members are approximately hour glass shape with opposing concave surfaces for receiving the bottle side walls juxtaposed therewith.

11. The apparatus of claim 9 wherein the bottle support members are disposed medially on the planar bottom wall.

12. The apparatus of claim 1 wherein the first rack comprises a planar bottom wall and an annular peripheral rail upstanding from the bottom wall, the first rack including a plurality of spaced bottle support members upstanding from the bottom wall and attached to the rail, the support members being generally frusto-conical in plan view in a direction normal to the planar bottom wall.

13. The apparatus of claim 1 wherein the first rack comprises a planar bottom wall and an annular side rail extending from the planar bottom wall periphery, the apparatus including a plurality of like bottle support members arrayed generally centrally the planar bottom wall in the longitudinal direction and a plurality of side bottle support members arrayed along and attached to the annular side rail and extending from the planar bottom wall.

14. The apparatus of claim 13 wherein the planar bottom wall has a plurality of depending ribs for engagement with the hand truck rails to preclude horizontal displacement of the first rack relative to the hand truck rails.

15. The apparatus of claim 8 wherein the fourth and fifth racks are bonded to each other.

16. A water bottle racking apparatus for use with a hand truck having a plurality of bottle supporting rails, the bottles having a bottom section and a top neck section, the apparatus comprising:

a first bottom rack with a plurality of ribs depending from a bottom wall thereof for mating with the hand truck rails to preclude displacement of the first rack relative to the hand truck during transport, the first rack including a plurality of bottle support and divider members extending from the first rack bottom wall opposite the ribs for supporting the bottle bottom sections in spaced relation; and a second top rack including depending members for overlying the bottles and arranged for receiving the top neck sections of the bottles.

17. The apparatus of claim 16 wherein the first bottom rack is arranged for receiving and storing a staggered first array of bottles upright with respect to the force of gravity in a longitudinal direction, the first rack for storing the bottles in multiple columns in the longitudinal direction and rows transverse to the longitudinal direction in the first array, the bottles in each column being aligned longitudinally, the bottles in adjacent columns being staggered with respect to each other so that the rows are aligned inclined to the longitudinal direction.

18. The apparatus of claim 16 wherein the bottles are each of the same given diameter, the adjacent columns being arranged so that the transverse dimension of two adjacent columns normal to the longitudinal direction is less than twice the diameter of a bottle.

19. The apparatus of claim 16 wherein the second rack has a plurality of recesses for receiving and mating with the depending ribs in the first rack.

20. The apparatus of claim 17 wherein the first and second racks are bonded to each other.

21. A bottled water apparatus for storing and transporting water bottles on a hand truck having bottom rails on which the bottles are to be stored for transport, the bottles having a bottom wall, an annular side wall and a pouring spout on a neck attached to the side wall distal the bottom wall, the apparatus comprising:

a first bottom rack for receiving and storing a staggered first array of bottles upright in a longitudinal direction with respect to the force of gravity, the first rack for storing the bottles in multiple columns in the longitudinal direction and rows transverse to the longitudinal direction in the array, the bottles in each column being aligned longitudinally, the bottles in adjacent columns being staggered with respect to each other so that the rows are aligned inclined to the longitudinal direction;

bottle supports and dividers attached to the first rack for aligning and supporting the bottles in said array; and a second top rack arranged to receive the necks and spouts of the bottles in the staggered array.

22. The apparatus of claim 21 wherein the first rack has depending first ribs for engaging the hand truck to preclude horizontal displacement of the first rack on the hand truck during transport.

23. The apparatus of claim 22 including a third rack comprising fourth and fifth racks having the same respective configurations as the first and second racks, the fourth and fifth racks being attached to each other in abutting relation, the third rack for receiving and storing a second array of said bottles in said staggered arrangement on top of the first array, the third rack for engagement with and receiving the necks and spouts of the bottles in the first array, the first rack having a plurality of recesses corresponding to and aligned with said first ribs, the second rack having a plurality of second ribs depending therefrom and engaged with the recesses of the first rack.

24. The apparatus of claim 23 wherein the second rack has an annular upstanding rail at its periphery.

* * * * *

UNITED STATES PATENT AND TRADEMARK OFFICE
CERTIFICATE OF CORRECTION

PATENT NO. : 6,851,563 B1
DATED : February 8, 2005
INVENTOR(S) : Frank Lipari

It is certified that error appears in the above-identified patent and that said Letters Patent is hereby corrected as shown below:

<u>Title page,</u>
Item [57], ABSTRACT,
Line 6, change "or" to -- lower --.

<u>Column 1,</u>
Line 8, change "relays" to -- relates --
Line 11, change "battles" to-- bottles --
Line 28, change "topically" to -- typically --
Line 52, change "fag" to -- fall --

<u>Column 2,</u>
Line 5, insert a period after "pallet"
Line 19, change "6" to -- 5 --
Line 29, change "bodes" to -- bottles --
Line 36, change "recent" to -- receiving --

<u>Column 3,</u>
Line 2, change "wag" to -- wall --
Line 3, change "recess" to -- recesses --
Line 7, change "receding" to -- receiving --
Line 48, delete "is" after word "first"
Line 67, change "buck" to -- truck --

<u>Column 4,</u>
Line 9, change "jails" to -- rails --

<u>Column 5,</u>
Line 10, change "fit" to -- first --

<u>Column 6,</u>
Line 8, insert the word "racks" before the word "used"

<u>Column 7,</u>
Line 4, change "48" to -- 46 --
Line 30, insert "transport" at beginning of line
Line 32, change "rac" to -- rack --
Line 50, change "68" to -- 66 --
Line 58, change "56" to -- 58 --

UNITED STATES PATENT AND TRADEMARK OFFICE
CERTIFICATE OF CORRECTION

PATENT NO. : 6,851,563 B1
DATED : February 8, 2005
INVENTOR(S) : Frank Lipari

It is certified that error appears in the above-identified patent and that said Letters Patent is hereby corrected as shown below:

Column 8,
Line 7, change "84" to -- 64 --
Line 23, change "object" to -- objects --
Line 35, insert -- stored -- after "The"

Column 9,
Line 4, change "48" to -- 46 --
Line 8, change "if" to -- thereof --
Line 9, change "91" to -- 90 --
Line 22, change "9" to -- g --
Line 34, change "bode" to -- bottle --
Line 44, change "68" to -- 66 --
Line 48, change "3" to -- 3a --
Line 64, change "int iate" to -- intermediate --

Column 10,
Line 12, change "tuck" to -- truck --
Line 23, change "128" to -- 126 --
Line 32, change "fist" to -- first --

Signed and Sealed this

Tenth Day of May, 2005

JON W. DUDAS
*Director of the United States Patent and Trademark Office*